United States Patent [19]

Robbins et al.

[11] Patent Number: 4,763,946

[45] Date of Patent: Aug. 16, 1988

[54] VISOR

[75] Inventors: Craig Robbins, Grand Haven; Michael L. Lanser, Holland; Kim L. Van Order, Hamilton; Joseph H. Weber, Holland, all of Mich.

[73] Assignee: Prince Corporation, Holland, Mich.

[21] Appl. No.: 58,996

[22] Filed: Jun. 8, 1987

[51] Int. Cl.$^4$ .............................................. B60J 3/00
[52] U.S. Cl. ................................................ 296/97 H
[58] Field of Search ............................ 296/97 H, 97 R

[56] References Cited

U.S. PATENT DOCUMENTS

| 3,751,106 | 8/1973 | Mahler et al. | 296/97 H |
|---|---|---|---|
| 4,275,916 | 6/1981 | Skogler | 296/97 H |
| 4,458,938 | 7/1984 | Viertel et al. | 296/97 H |
| 4,570,990 | 2/1986 | Flowerday | 296/97 H |
| 4,711,483 | 12/1987 | Gulette et al. | 296/97 H |

FOREIGN PATENT DOCUMENTS 2117175 10/1972 Fed. Rep. of Germany .

Primary Examiner—Robert R. Song
Attorney, Agent, or Firm—Price, Heneveld, Cooper, DeWitt & Litton

[57] ABSTRACT

A visor includes a molded polymeric core having a plurality of channels on at least one side defined by a pair of spaced upstanding walls with one of the walls having a plurality of spaced notches formed therein for receiving tabs projecting outwardly from aligned upstanding walls formed in the corresponding mating visor half. The tabs extend into the corresponding slots and the backing wall prevents their removal. Visors embodying another aspect of the present invention integrally include a plurality of outwardly projecting pins and corresponding mating recesses formed continuously around the periphery on opposite visor core halves for compressing the edges of the upholstery material and clamping them in a secure position as the visor halves are brought together during manufacturing.

20 Claims, 2 Drawing Sheets

U.S. Patent    Aug. 16, 1988    Sheet 1 of 2    4,763,946
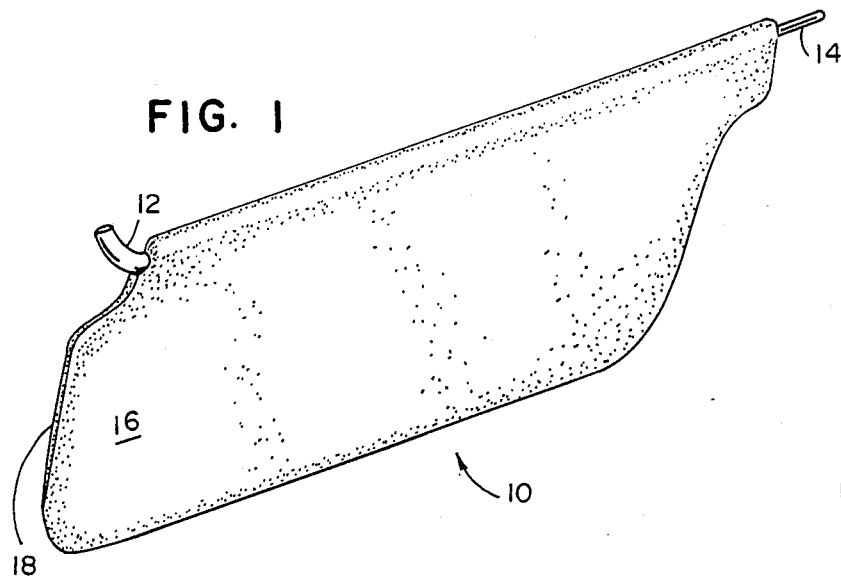
FIG. 1
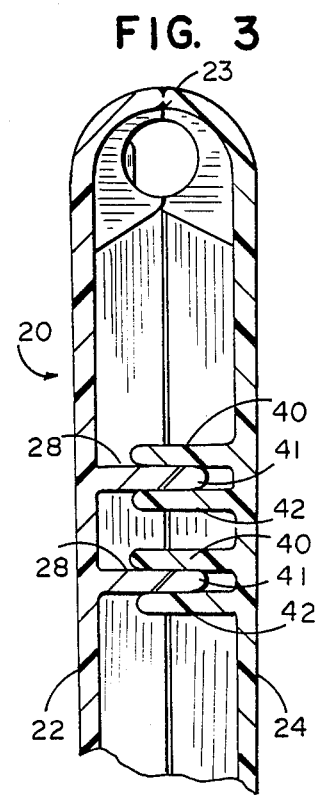
FIG. 3
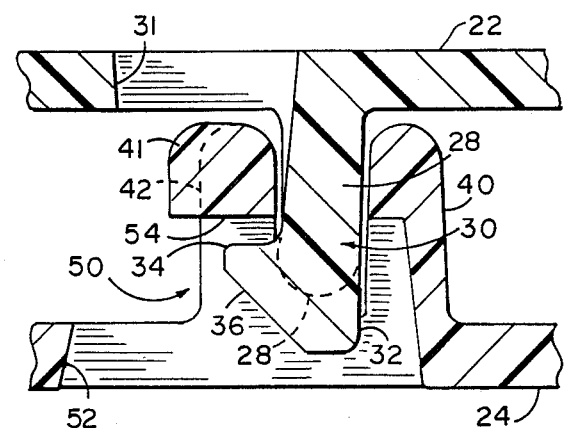
FIG. 4
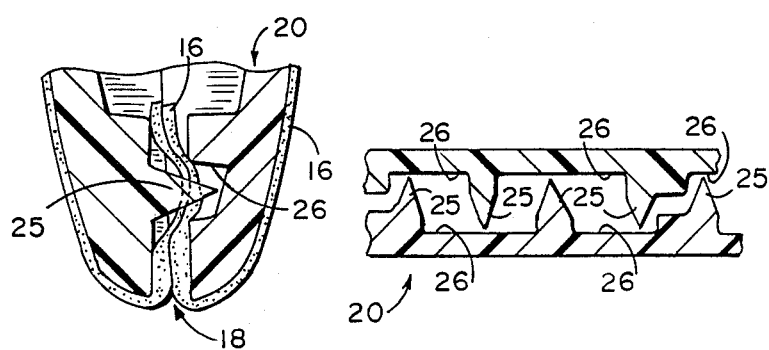
FIG. 5    FIG. 6
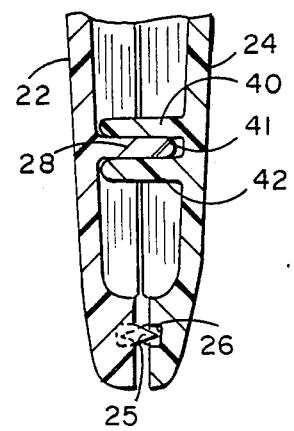

VISOR

BACKGROUND OF THE INVENTION

The present invention pertains to vehicle visors and particularly visors having a folded, molded core.

Visors for vehicles and particularly those employing an illuminated vanity mirror insert such as disclosed in U.S. Pat. No. 3,926,470 have been manufactured using a clamshell-type folded polymeric core made of a suitable polymeric material such as polypropylene. In earlier visor construction, such as that disclosed in the above identified patent, the edge of the upholstered visor was trimmed using a trim bead and in some cases the trim bead was attached to the edge of the core by stitching through the polymeric material itself although this method was quite difficult. The clamshell visor core was also held together in some cases using cement or with interlocking arms as shown by element 48 in FIG. 6 of the above identified patent. The interlocking arms, however, were used in connection with the edge bead which assisted in holding the visor core halves together and in some instances rivets were also employed for holding the visor core halves together.

Subsequent to this earlier technology, visor halves were bonded together using in some cases heat fusion or through an adhesive material as disclosed in U.S. Pat. No. 4,570,990. In connection with this newer construction, the edge bead was eliminated and the upholstery fabric was wrapped around the edges of the visor core halves prior to the folding of the clamshell-type core together. Thus, the folded core halves provided a duel function. First they folded in an assembled position for the visor shape but also, the edges served to clamp the edge of the fabric around the periphery of the visor core to provide a neat and trim appearance without allowing the fabric to pull from the abutting peripheral edges of the visor core. The utilization of the fusion process worked successfully, however, it adds the additional steps of either heat fusing the core halves prior to folding and/or using an adhesive material either for bonding the core halves together and/or attaching the upholstery to the core prior to the folding and bonding of the core halves together. U.S. Pat. No. 4,458,938 discloses a foam core visor with a wire frame and one or more braces with snap together pins and holes. The visor cover is wrapped around the core halves and extends between them.

Thus, although the newer generation clamshell-type visors have an improved appearance by removing the edge bead and provide a folded core with some cores of sufficiently rigid construction and having a depth sufficient for inserting an illuminated vanity mirror therein, the manufacturing of such visors is somewhat expensive due to the foam core construction or the attachment of the upholstery material to the visor core and the subsequent bonding of the core halves together.

SUMMARY OF THE PRESENT INVENTION

The visor of the present invention overcomes the deficiencies of the prior art by providing a visor core which is folded together and which according to a preferred embodiment snap fits together while mechanically securely clamping the edges of the upholstery covering around the periphery of the core halves. It accomplishes the desired visor appearance in the preferred embodiment with a stiff but resilient core without the need for bonding by heat fusion or utilizing an adhesive material thereby reducing the cost of the visor. Visors embodying one aspect of the present invention include a molded polymeric core having a plurality of slots on at least one side defined by a plurality of spaced notches formed therein for receiving tabs projecting outwardly from a corresponding mating visor half. The tabs extend into the corresponding slots and a backing wall prevents their removal.

Visors embodying another aspect of the present invention integrally include a plurality of outwardly projecting pins and corresponding mating recesses formed continuously around the periphery on opposite visor core halves for compressing the edges of the upholstery material and clamping them in a secure position as the visor halves are brought together during manufacturing. Visors embodying both features include visor cores which are snapped together with projections holding the edges of the visor upholstery material around the peripheral edges of the visor core without the need for bonding.

These and other features, objects and advantages of the present invention will become apparent upon reading the following description thereof together with reference to the accompanying drawings in which:

BRIEF DESCRIPTION OF THE DRAWINGS

FIG. 1 is a perspective view of a visor embodying the present invention;

FIG. 3 is a fragmentary vertical cross-sectional view of the visor core shown in FIG. 2 shown in a closed position and without a covering;

FIG. 4 is an enlarged fragmentary cross-sectional view showing one of the several snap locks employed in the visor core of the present invention;

FIG. 5 is an enlarged fragmentary cross-sectional view of the upholstery fastening structure employed in the visor of the present invention; and FIG. 6 is an enlarged fragmentary cross-sectional view taken through the edge of the visor core shown in the folded together position and further illustrating the upholstery fastening structure.

DETAILED DESCRIPTION OF THE PREFERRED EMBODIMENT

Figure 2:
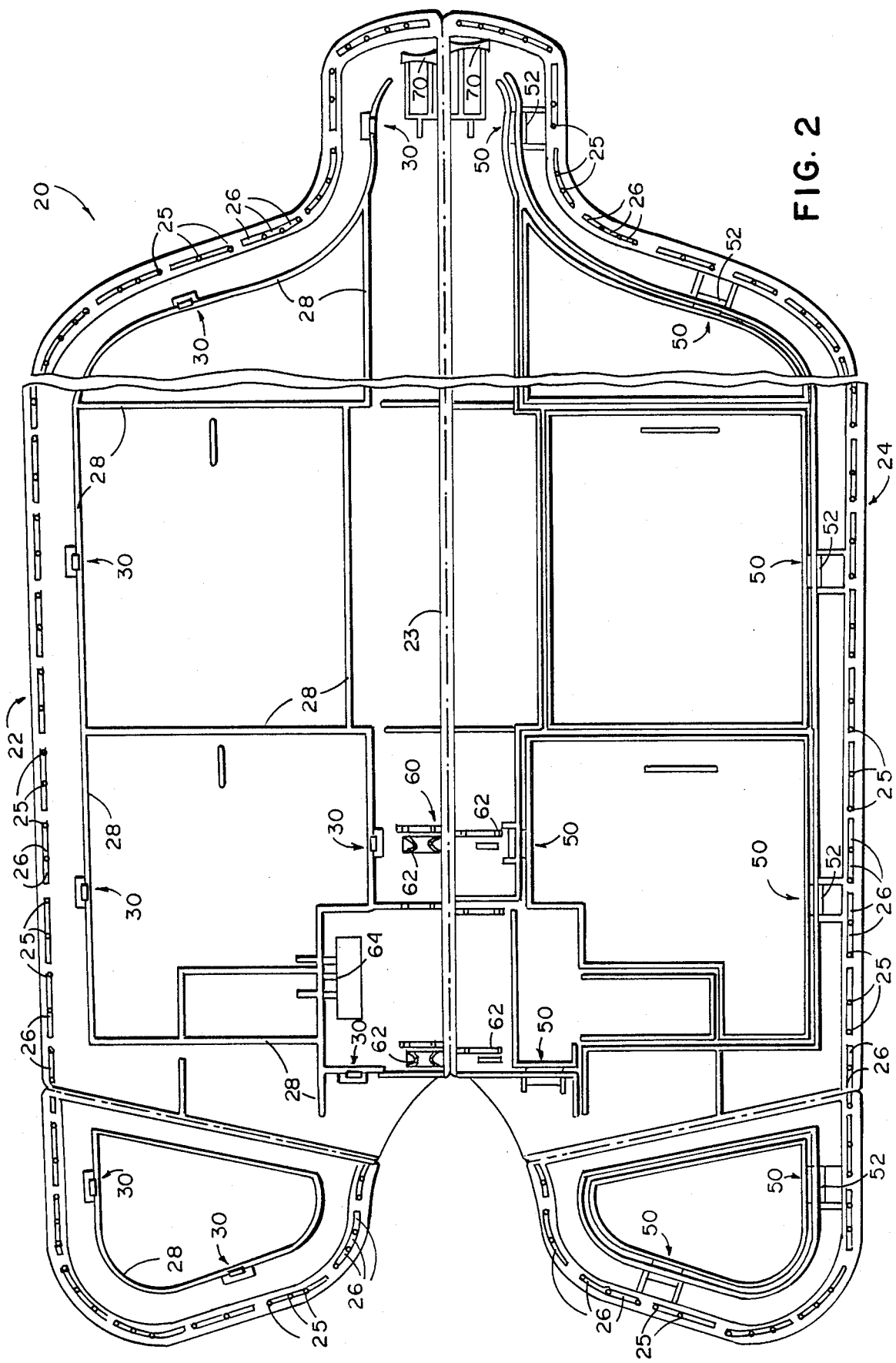
FIG. 2 is a fragmentary top plan view of a visor core embodying the present invention.

Referring initially to FIG. 1 there is shown a visor 10 embodying the present invention and which is made employing a butterfly-type or clamshell-type folded core 20 (FIGS. 2-6) of stiffly resilient polymeric material such as polypropylene. The core construction is shown in detail in FIGS. 2-6 and supports therein a visor mounting elbow bracket 12 (FIG. 1) extending from one end and a mounting post 14 at the opposite end for mounting the visor to, in the case of the visor shown in FIG. 1, the driver side of the vehicle. The visor core 20 is covered by a suitable upholstery material such as foam backed fabric 16 which, as best seen in the left edge of FIG. 1, is tucked at 18 and clamped into position between the edges of the core to provide a neat and trim appearance to the visor without the utilization of an edge trim bead. This feature in itself has been achieved by different structure in U.S. Pat. No. 4,570,990 and is in widespread commercial use. The visor 10 may optionally include an illuminated vanity mirror package by providing a suitable opening in the one side of the visor core for receiving an illuminated vanity mirror package such as that disclosed in U.S. Pat. No. 4,227,241.

Referring now to FIG. 2 there is shown the polymeric core 20 of visor 10 which comprises an upper half 22 and a lower half 24 integrally formed and joined along an integral hinge 23 which holds the upper and lower halves together. The core 20 is molded of a suitable stiff but resilient polymeric material such as polypropylene and includes along its outer peripheral edges a plurality of conically tapered pins 25 which are shown in greater detail in FIGS. 3, 5 and 6 and which align with recesses 26 formed in the mating portion of the opposite core half. Thus a pin 25 from the upper half 22 will align with a corresponding recess 26 in the lower half 24 of the visor when the visor core is folded together as shown in FIG. 3 and in greater detail in FIG. 5. The pins and recesses 25 and 26 are thus alternately staggered in a continuous pattern along the entire peripheral edge of each half of the visor core and the recesses and pins on one of the visor core halves are likewise alternately staggered with respect to the corresponding pins and recesses on the other visor core half such that they rest together as best seen in FIGS. 5 and 6.

In addition to the fabric clamping structure comprising the pins and recesses, the upper half 22 of the visor core includes a framework pattern of ridges or outwardly extending walls 28 which include, at spaced intervals, tab means 30. The lower core half 24 includes in an aligned and mating position, parallel spaced wall means 40 and 42 which follow the same shape and contour as walls 28 which are spaced to define a channel 41 to allow walls 28 to nest between walls 40 and 42 as best seen in FIG. 3. Between walls 40 and 42 at select locations aligned with the tab means 30 are slot means 50 to permit as best seen in connection with FIG. 4 described below, the tab means to snap fit within the slot means 50 for securely clamping the visor cores together with the fabric wrapped around and captively held in a clamped fashion by the pins and slots 25 and 26, respectively.

In the preferred embodiment of the invention also, the visor core 20 includes a pivot rod mounting assembly 60 (FIG. 2) comprising a plurality of spaced cradle halves 62 which form semicircular resilient sockets spaced longitudinally adjacent hinge 23 and on opposite sides thereof such that a visor rod can be snap fitted therein. Assembly 60 also includes a flange 64 for anchoring an end of a torque fitting such as the type disclosed in U.S. Pat. No. 4,390,202. Similarly, on the opposite end of the visor there is provided a pair of semicircular sockets 70 for receiving pin 14 of the visor.

As can be seen in FIG. 2, the walls 28 form on the left edge of the visor a generally triangular pattern with correspondingly mated pair of walls 40 and 42 on the lower half of the visor. This closed loop half includes two snap locking tabs 30 and associated sockets 50. The central section of the visor includes a pair of generally square shaped sections of walls 28 and the right edge of the visor including a somewhat triangular section. Each of the sections of walls 28 align with and nest within the spaced walls 40 and 42 of the lower visor half 24 when the visor halves are folded over with the tabs 30 fitting within the aligned corresponding sockets 50. One of the substantially identical tabs and sockets 30 and 50, respectively are shown in detail in FIG. 4 which is now described.

The tab 30 is integrally formed on wall 28 and includes a slightly longer downwardly projecting end 32 having a outwardly projecting flange 34 with a inclined leading edge 36 for assisting in the insertion of the tab 30 into the channel 41 formed between walls 40 and 42. Formed adjacent each of the tabs 30 and through visor side 22 are relief apertures 31 (FIGS. 2 and 4) which adds to the resiliency of the tabs 30 and permits clearance of the upwardly projecting walls 42 during assembly. Each of the slots 50 are defined by an opening 52 spanning both sides of wall section 42 as best seen in FIGS. 2 and 4 and a horizontally extending slot 54 extending through wall section 42 spaced downwardly from the reinforced top 41 of the wall as best seen in FIG. 4. Wall 40 extends behind and opposite slot 54 to prevent the tab flange 34 from slipping out of mating engagement with surface 54 of the slots 50 thereby holding the tabs in a securely locked position. There is sufficient resilience of walls 40 and 42 with slots 52 and 54 that the inclined wall 36 of the tab wedges between the walls such that the tab can be inserted between the walls into an engaging position with slot 50. Once engaged, however, it is virtually impossible to remove the tabs without ripping off the projection 34 from the tab itself. The backing wall 40 thereby provides the desired structure which in connection with the continuous channel 41 securely hold the visor core halves together.

During assembly of the visor, the upholstery is cut in a pattern slightly larger than that of the silhouette visor core as seen in FIG. 2 and held in overlapping engagement around the core halves by relatively thin fingers of an assembly machine. Prior to folding the visor core halves 22 and 24 together, pin 14 is inserted into socket 70 and the visor elbow bracket assembly 12 is inserted in socket 60 so that when the visor core halves are snapped together, the visor assembly is completed. As the core halves are folded together, the conically tapered end of pins 25 will begin to compress the relatively thick foam padded upholstery materials 16 before the tabs 30 and slots 50 interengage. The upholstery holding fingers can then be withdrawn from the visor and the visor halves pushed together driving the pins 25 partially through the upholstery material and compressing it into the slots 26 as best seen in FIG. 5. As seen in FIG. 6, the pins 25 are alternately staggered with the slots 26 so that viewed along the edge of the visor, the two layers of upholstery material 16 undulate between visor core halves 22 and 24 and are securely held by the piercing of the fabric by the pointed conical projections 25. The projections 25 have a height of approximately 0.1 inches and are spaced approximately 0.6 inches apart continuously along the peripheral edge of the visor core. Similarly, recesses 26 have a width of 0.1 inches corresponding to the diameter of the base of the pins and have a depth of 0.05 inches so that the pins 25 substantially pierce the material 16 and extend closely adjacent the floor of the recesses of the corresponding visor half.

It will become apparent to those skilled in the art that various modifications to the preferred embodiment described herein can be made without departing from the spirit or scope thereof as defined by the appended claims.

The embodiments of the invention in which an exclusive property or privilege is claimed are defined as follows:

1. A visor comprising a molded polymeric visor core divided along a center line to define two halves, one core half having a plurality of alternately staggered pins and recesses extending along the peripheral edge thereof and aligned with alternately staggered recesses and pins respectively of the other core half such that when the core halves are brought together, an upholstery material is clamped in place by said pins and recesses of said visor core.

2. The apparatus as defined in claim 1 wherein said pins are conical in shape and extend continuously along said peripheral edge of said visor.

3. The apparatus as defined in claim 2 wherein said visor core is made of a resilient polymeric material.

4. The apparatus as defined in claim 1 wherein said visor core further includes tab means on one of said visor core halves and aligned slot means on the other of said visor core halves for snap locking said visor core halves together.

5. The apparatus as defined in claim 4 wherein said slot means is defined by a pair of spaced walls having a channel therebetween with an aperture formed in at least one of said walls for receiving said tab means.

6. The apparatus as defined in claim 5 wherein said pins are conical.

7. The apparatus as defined in claim 6 wherein said core is molded of a resilient polymeric material.

8. The apparatus as defined in claim 7 wherein said polymeric material is a polypropylene.

9. A visor core construction comprising:
a resilient polymeric core having two halves, one of said halves including a plurality of tabs projecting outwardly therefrom and the other of said halves including slot means for captively receiving said tabs, wherein said core includes wall means positioned to urge said tab into locking engagement with said slot means for holding said core halves together.

10. The apparatus as defined in claim 9 wherein said core is integrally molded of a resilient polymeric material.

11. The apparatus as defined in claim 10 wherein said tabs have a projecting end each of which lockably engages an edge of the slot into which the tab extends.

12. The apparatus as defined in claim 11 wherein said slot means is formed in a second wall and each of said tabs includes a projecting end having a width greater than the spacing between said walls.

13. The apparatus as defined in claim 12 wherein said projecting ends of said tabs have an inclined leading edge to facilitate their insertions between said walls.

14. The apparatus as defined in claim 13 wherein said wall means includes a pair of substantially continuous parallel spaced walls defining a channel therebetween and wherein said tab means are formed on an additional wall which nests within said channel.

15. The apparatus as defined in claim 14 and further including a plurality of alternately staggered pins and recesses formed along the edge of each core half for nesting together for clamping and locking upholstery material between the edges of the core halves.

16. The apparatus as defined in claim 15 wherein said pins are conical in shape and extend continuously along said peripheral edge of said visor.

17. The visor core construction comprising:
a resilient polymeric core having two halves, one of said halves including a plurality of tabs projecting outwardly therefrom and the other of said halves including channel means defined by a pair of spaced walls for captively receiving said tabs, wherein at least one wall of said channel means includes a plurality of slots formed therein which are positioned for receiving said tabs in locking engagement for holding said core halves together; and
wherein said one core half includes a plurality of alternately staggered pins and recesses extending along the peripheral edge thereof and aligned with alternately staggered recesses and pins respectively of said other core half such that when the core halves are brought together, an upholstery material is clamped in place by said pins and recesses of said visor core.

18. The apparatus as defined in claim 17 wherein said pins are conical in shape and extend continuously along said peripheral edge of said visor.

19. The apparatus as defined in claim 18 wherein said visor core is made of a polypropylene.

20. The apparatus as defined in claim 17 wherein said core includes resilient socket means for snap-in receiving visor support rod.

* * * * *